(12) United States Patent
Cheng et al.

(10) Patent No.: US 11,475,830 B1
(45) Date of Patent: Oct. 18, 2022

(54) DISPLAY DEVICE BRIGHTNESS CONTROLS (71) Applicant: Hewlett-Packard Development Company, L.P., Spring, TX (US)

(72) Inventors: Yuan Hsi Cheng, Taipei (TW); Yu Shu Wang, Taipei (TW); Shu-Ting Hsu, Taipei (TW); Ming-Fong Chou, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/387,277

(22) Filed: Jul. 28, 2021

(51) Int. Cl.
*G09G 3/32* (2016.01)
*G01S 17/04* (2020.01)

(52) U.S. Cl.
CPC ............... *G09G 3/32* (2013.01); *G01S 17/04* (2020.01); *G09G 2320/0626* (2013.01); *G09G 2360/144* (2013.01)

(58) Field of Classification Search
CPC ............... G09G 3/32; G09G 2360/144; G09G 2320/0626; G01S 17/04
See application file for complete search history.

(56) References Cited

U.S. PATENT DOCUMENTS

| 9,330,606 | B2 | 5/2016 | Barnhoefer | |
|---|---|---|---|---|
| 10,204,592 | B1 | 2/2019 | Trim | |
| 11,250,759 | B1* | 2/2022 | Peana | G09G 3/3208 |
| 2009/0160878 | A1* | 6/2009 | Kwong | G09G 5/02 345/690 |
| 2016/0372056 | A1 | 12/2016 | Hsu | |
| 2018/0012560 | A1 | 1/2018 | Yuan | |
| 2019/0221169 | A1 | 7/2019 | Hsu | |

\* cited by examiner

*Primary Examiner* — Muhammad N Edun
(74) *Attorney, Agent, or Firm* — Brooks, Cameron & Huebsch, PLLC (57) ABSTRACT

In some examples, the disclosure describes a device that includes a first light sensor to determine a first quantity of light at a first location; a second light sensor to determine a second quantity of light at a second location; a display device to display images; a processor; and a non-transitory memory resource storing machine-readable instructions stored thereon that, when executed, cause the processor to: determine when a difference between the first quantity of light and the second quantity of light device exceeds a threshold quantity, select a light sensor from the first light sensor and the second light sensor based on the first quantity of light received by the first light sensor and the second quantity of light received by the second light sensor, and alter a brightness of the display device based on the selected light sensor.

11 Claims, 5 Drawing Sheets

DISPLAY DEVICE BRIGHTNESS CONTROLS

BACKGROUND

Computing devices can be portable computing devices that can be positioned in a plurality of lighting situations. In some examples, a particular environment can have a plurality of different light sources (e.g., lamps, etc.) positioned at different locations. In some examples, a user can move the portable computing devices to different locations within the particular environment. Different environments can have different lighting properties and different areas within the environment can also have different lighting properties.

DETAILED DESCRIPTION

A user may utilize a computing device for various purposes, such as for business and/or recreational use. As used herein, the term computing device refers to an electronic device having a processor and a memory resource. Examples of computing devices can include, for instance, a laptop computer, a notebook computer, a desktop computer, and/or a mobile device (e.g., a smart phone, tablet, personal digital assistant, smart glasses, a wrist-worn device, etc.), among other types of computing devices.

In some examples, the computing device can include a display device to display images generated by the computing device and/or to allow a user to interact with the computing device. In some examples, the display device can utilize a plurality of different brightness settings to display the images. In some examples, the brightness of a display device can refer to a perceived intensity of light generated by the display device. In some examples, the brightness of the display can be measured in a quantity of lumens or other quantitative value (e.g., lux, etc.). The same brightness setting of a display device can appear brighter to a user in a relatively darker area and appear dimmer to the user in a relatively brighter area. In this way, a brightness level of a room or physical area surrounding the computing device and/or display device can be utilized to alter a brightness of the display device to improve a visual experience of a user.

In some examples, a particular area occupied by the computing device and/or display device can have inconsistent lighting. For example, the particular area can include a plurality of overhead lamps that may not provide an equal quantity of light throughout the area. In this example, a first location within the particular area can have a first quantity of light while a second location within the particular area can have a second quantity of light. In some examples, the first location and the second location can be relatively close in proximity. For example, the first location can be a first position of the computing device and/or display device while the second location can be a second position of the computing device and/or display device. In this way, the inconsistent lighting of an area can generate a response to alter a brightness of the display device to a brightness setting that can create a negative visual experience for a user. That is, the computing device can alter the display device for a first light environment when a user is actually experiencing a second light environment that is different than the first light environment.

The present disclosure relates to display device brightness controls. In some examples, controlling the display device brightness can include controlling a quantity of light generated by a backlight of the display device. That is, the brightness of the display device can be altered by increasing the brightness of the backlight and/or decreasing the brightness of the backlight. In other examples, the display device may not include a backlight. In these examples, the brightness settings of the display device can be altered to increase a quantity of light emitted by the display device or altered to decrease the quantity of light emitted by the display device.

In some examples, a computing device associated with the display device can include a plurality of ambient light sensors to detect a quantity of light at different areas of the computing device. For example, a computing device can include a first ambient light sensor coupled to the display device to determine a quantity of ambient light within an area of the display device and include a second ambient light sensor coupled to an input device to determine a quantity of ambient light within an area of the input device. In this example, the display device and the input device can be coupled to each other by a hinge to allow the display device and the input device to rotate around the axis of the hinge. In some examples, the difference between the quantity of light captured by the first ambient light sensor and a quantity of light captured by the second light sensor can be utilized to alter a brightness of the display device such that the brightness of the display device can be altered within areas that include non-uniform light. In some examples, a proximity sensor and/or angle between the display device and the input device can be utilized with the difference between the quantity of light determined by the first and second ambient light sensors to improve the brightness controls of the display device. In this way, the brightness of the display device can be more accurately adjusted to improve the visual experience of a user in a plurality of different lighting conditions.

Figure 1:
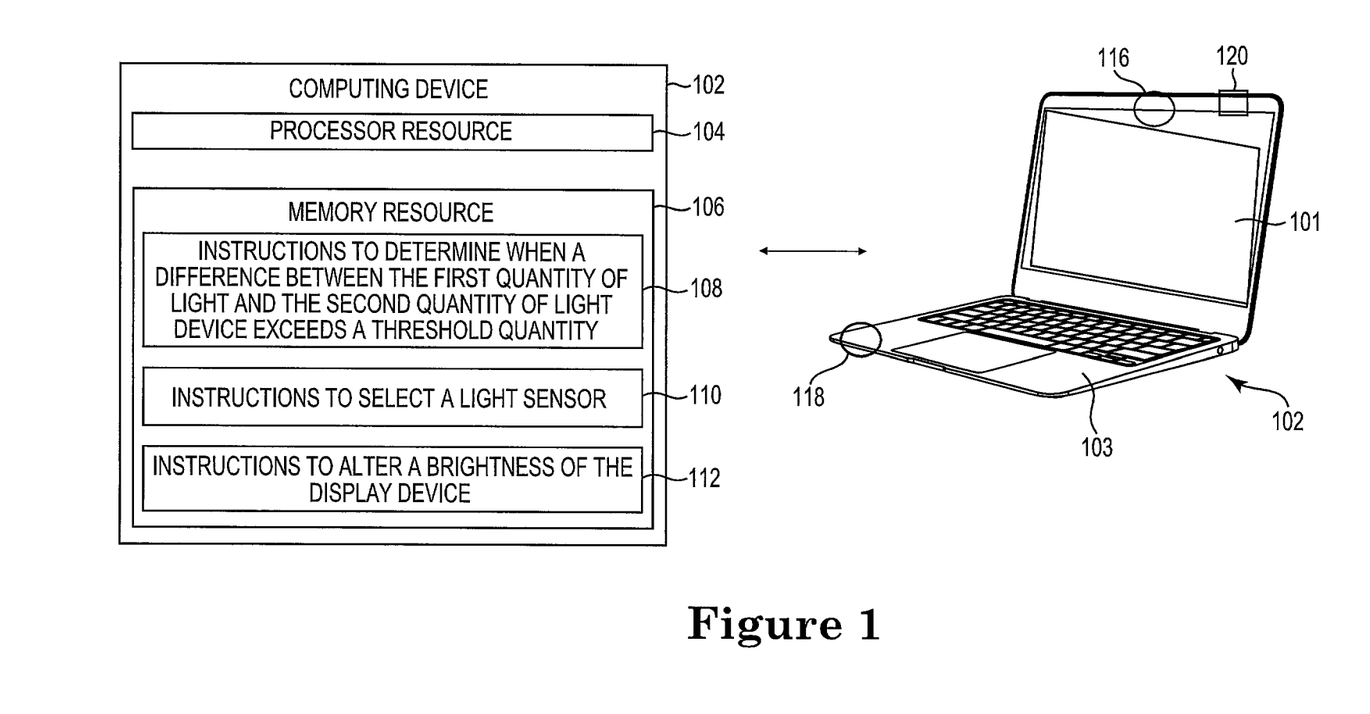
FIG. 1 illustrates an example of a computing device for display device brightness controls.

FIG. 1 illustrates an example of a computing device 102 for display device 101 brightness controls. As described herein, the computing device 102 can include a display device 101 that can be utilized to generate images utilizing a plurality of light sources and/or a backlight source. For example, the display device 101 can include a plurality of light emitting diodes (LEDs) and/or a backlight to generate a plurality of pixels that can be utilized to generate an image on the display device 101. In some examples, the display device 101 can be coupled to an input device 103. In some examples, the input device 103 can be a keyboard of a laptop computing device that can be coupled to the display device 101 by a hinge to allow the display device 101 to rotate relative to the input device 103 around the hinge. In other examples, the input device 103 can be a touchscreen display device that can be utilized to provide inputs for the computing device 102.

In some examples, the angle between the display device 101 and the input device 103 can be measured utilizing a plurality of sensors. For example, the angle between the display device 101 and the input device 103 can be measured by accelerometer sensors, gyroscope sensors, or other types of sensors that can determine the position of the display device 101 relative to the input device 103. As described further herein, the angle between the display device 101 and the input device 103 can be utilized to select a particular light sensor from a plurality of light sensors positioned at different locations of the computing device 102.

In some examples, the computing device 102 can include a first light sensor 116 coupled to the display device 101 and a second light sensor 118 coupled to the input device 103. In this way, the first light sensor 116 can be utilized to monitor a quantity of light at a first area surrounding the computing device 102 and the second light sensor 118 can be utilized to monitor a quantity of light at a second area surrounding the computing device 102. As described herein, lighting within a particular area (e.g., room, office, coffee shop, etc.) can be non-uniform, such that portions of the area can be relatively brighter and other portions of the area can be relatively dimmer. In this way, the first light sensor 116 and the second light sensor 118 can be utilized together to determine a brightness level for the display device 101 of the computing device 102. In these examples, the computing device 102 can include instructions to determine that the first quantity of light is associated with a first area surrounding the computing device 102 based on the first location of the first light sensor 116 and determine that the second quantity of light is associated with a second area surrounding the computing device 102 based on the second location of the second light sensor 118.

In some examples, the computing device 102 can include a proximity sensor, such as a time of flight sensor 120 that can be utilized to determine when there is an object within a particular distance of the display device 101 and/or the computing device 102. In some examples, the time of flight sensor 120 can have a particular range of detection. In this way, the time of flight sensor 120 can determine if the distance of the object may be blocking or masking a portion of light captured by the first light sensor 116 and/or the second light sensor 118 based on the determined distance of the object. For example, the time of flight sensor 120 can be utilized to determine when a user of the computing device 102 is within a particular distance threshold of the display device 101 and/or the computing device 102. In these examples, the computing device 102 can alter the brightness of the display device 101 based in part on whether the user or an object is occupying an area that is within the particular threshold distance of the display device 101, which can indicate that a portion of light from the area may be blocked and may not be collected or identified by the first light sensor 116 and/or the second light sensor 118.

The computing device 102 can include instructions 108 that can be executed by the processor 104 to determine when a difference between the first quantity of light and the second quantity of light exceeds a threshold quantity. In some examples, the first quantity of light can be determined by the first light sensor 116 and the second quantity of light can be determined by the second light sensor 118. In some examples, the first light sensor 116 and the second light sensor 118 can be separate ambient light sensors that can determine a quantity of ambient light within corresponding areas of the first light sensor 116 and the second light sensor 118, respectively. As used herein, a light sensor can include a device that include a photodetector that can sense a quantity of ambient light present. As used herein, a photodetector can include a device that includes components that detect light or electromagnetic radiation. For example, the photodetector can include a photodiode, phototransistor, solar cell, or other type of device that can determine the quantity of ambient light within a particular area and generate a signal to indicate the corresponding quantity of light captured by the sensor.

In some examples, the difference between the first quantity of light and the second quantity of light can include subtracting a first value that represents the first quantity of light from a second value that represents the second quantity of light. In some examples, the absolute value of the resultant difference between the first value and the second value can be determined. In this way, difference between the first quantity of light and the second quantity of light can be utilized to determine when the difference is greater than a threshold quantity. As used herein, the threshold quantity can be a quantity or difference that is relatively large to determine when the ambient light in the first area of the first light sensor 116 is different than the ambient light in the second area of the second light sensor 118.

In some examples, the computing device 102 can include instructions to determine the difference between the first quantity of light and the second quantity of light in response to a determination that an angle between the display device 101 and an input device 103 is below a threshold angle. In some examples, the angle between the display device 101 and the input device 103 can be determined utilizing sensors positioned within the display device 101 and/or the input device 103. In these examples, the angle between the display device 101 and/or input device 103 can identify an orientation of the computing device 102. A used herein, the orientation of the computing device 102 can include a use mode of the computing device 102. For example, the orientation of the computing device 102 can be a laptop mode when the angle is between 0 and 100 degrees, a flat mode when the angle is 180 degrees, a tent mode when the angle is between 200 and 300 degrees, and a tablet mode when the angle is 360 degrees.

In some examples, the computing device 102 can include instructions to select the light sensor from the first light sensor 116 and the second light sensor 118 based on an angle between the display device 101 and an input device 103 coupled to the display device 101. In this way, the angle between the display device 101 and the input device 103 can be utilized to identify a corresponding area of the first light sensor 116 and the second light sensor 118. In some examples, the angle can indicate when the first light sensor 116 and/or the second light sensor 118 is covered or blocked, which can affect a quantity of light received at the first light sensor 116 or the second light sensor 118. In this way, the angle between the display device 101 and the input device 103 can be utilized to select a light sensor to be utilized for altering the brightness of the display device 101. In some examples, the angle between the display device 101 and the input device 103 can be utilized to determine when the difference between the first quantity of light and the second quantity of light is to be utilized to select the ambient light sensor and/or how to alter the brightness of the display device 101.

In some examples, the computing device 102 can include instructions 110 that can be executed by the processor 104 to select a light sensor. In some examples, the instructions 110 can be executed to select a light sensor from the first light sensor 116 and the second light sensor 118 based on the first quantity of light received by the first light sensor 116 and the second quantity of light received by the second light sensor 118. In some examples, the light sensor that receives the greater quantity of light can be selected as a selected light sensor. For example, the first light sensor 116 can be selected over the second light sensor 118 when the first quantity of light is greater than the second quantity of light. In a similar example, the second light sensor 118 can be selected over the first light sensor 116 when the second quantity of light is greater than the first quantity of light. In some examples, the selected light source can be utilized with a time of flight sensor 120 to determine the brightness of the display device 101 and alter the brightness of the display device 101 to the determined brightness based on the quantity of light received by the selected light sensor and the time of flight sensor 120.

In some examples, the computing device 102 can include instructions 112 that can be executed by the processor 104 to alter a brightness of the display device 101. In some examples, the computing device 102 can alter a brightness of the display device 101 based on the selected light sensor. As described herein, the brightness of the display device 101 can be altered or controlled by altering a brightness of the backlight of the display device 101. In other examples, the display device 101 can include a plurality of LEDs that can be altered to a relatively lower or higher brightness based on the selected light sensor. In some examples, a combination of the first light sensor 116 and the second light sensor 118 can be utilized to determine a brightness for the display device 101 and the brightness of the display device 101 can be altered based on the determined brightness.

In some examples, the computing device 102 can include a time of flight sensor 120 to determine when an object is within a region of the computing device 102. In these examples, the computing device 102 can alter the brightness of the display device 101 based when the time of flight sensor 120 determines the object is within the region of the computing device 102. In these examples, the object, such as a user, can block light from reaching the first light sensor 116 and/or the second light sensor 118. For example, the field of view for the first light sensor 116 can be directed away from the surface of the display device 101 or toward where a user would utilizing the computing device 102. In this way, a user or object positioned relatively close to the display device 101 may block light or a portion of light from reaching the first light sensor 116 and/or the second light sensor 118.

In some examples, the computing device 102 can include instructions to maintain the brightness of the display device when an occupied region of an object relative to the display device 101 exceeds a threshold distance. In this example, the threshold distance can be a relatively short distance from the display device 101. For example, the threshold distance can be a distance where if an object were present between the threshold distance and the display device 101, there is a likelihood that the object would be blocking light from hitting the first light sensor 116 and/or the second light sensor 118.

In some examples, the computing device 102 can include a processor 104 communicatively coupled to a memory resource 106. As described further herein, the memory resource 106 can include instructions 108, 110 that can be executed by the processor 104 to perform particular functions.

The computing device 102 can include components such as a processor 104. As used herein, the processor 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108, 110, 112. In other examples, the computing device 102 can include instructions 108, 110, 112, stored on a machine-readable medium (e.g., memory resource 106, non-transitory computer-readable medium, etc.) and executable by a processor 104. In a specific example, the computing device 102 utilizes a non-transitory computer-readable medium storing instructions 108, 110, 112 that, when executed, cause the processor 104 to perform corresponding functions.

Figure 2:
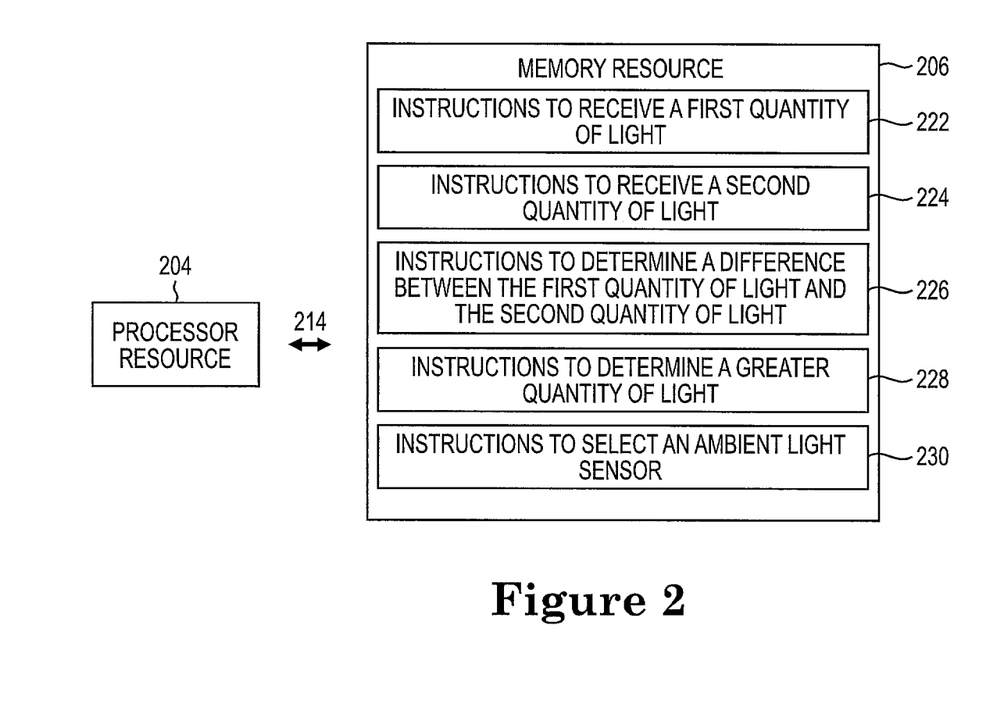
FIG. 2 illustrates an example of a memory resource for display device brightness controls.

FIG. 2 illustrates an example of a memory resource 206 for display device brightness controls. In some examples, the memory resource 206 can be a part of a computing device or controller that can be communicatively coupled to a computing system. For example, the memory resource 206 can be part of a computing device 102 as referenced in FIG. 1. In some examples, the memory resource 206 can be communicatively coupled to a processor 204 that can execute instructions 222, 224, 226, 228, 230, stored on the memory resource 206. For example, the memory resource 206 can be communicatively coupled to the processor 204 through a communication path 214. In some examples, a communication path 214 can include a wired or wireless connection that can allow communication between devices and/or components within a single device.

The memory resource 206 may be electronic, magnetic, optical, or other physical storage device that stores executable instructions. Thus, a non-transitory machine-readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine-readable medium (e.g., a memory resource 206) may be disposed within a controller and/or computing device. In this example, the executable instructions 222, 224, 226, 228, 230, can be "installed" on the device. Additionally, and/or alternatively, the non-transitory machine-readable medium (e.g., a memory resource) can be a portable, external or remote storage medium, for example, that allows a computing system to download the instructions 222, 224, 226, 228, 230, from the portable/external/remote storage medium. In this situation, the executable instructions may be part of an "installation package". As described herein, the non-transitory machine-readable medium (e.g., a memory resource 206) can be encoded with executable instructions for altering a dynamic power reduction mode of a radio.

In some examples, the memory resource 206 can include instructions 222 to receive a first quantity of light. In some examples, the memory resource 206 can include instructions to receive a first quantity of light from a first ambient light sensor coupled to a display device. As described herein, a device, such as a laptop or other type of computing device, can include a display device that is coupled to an input device by a hinge. In these examples, a first ambient light sensor can be coupled to the display device. As described further herein, the first ambient light sensor can be a directional light sensor that captures light provided to a particular surface of the device or from a particular direction. That is, the first ambient light sensor may receive or capture light that is directed on to the surface of the display device. However, the first ambient light sensor may not captured light directed to an enclosure or back side of the display device. In addition, a portion of the light directed to the display device can be blocked by an object or human user when the object or human user is within a threshold distance from the first ambient light sensor.

In some examples, the memory resource 206 can include instructions 224 to receive a second quantity of light. In some examples the memory resource 206 can include instructions to receive a second quantity of light from a second ambient light sensor coupled to an input device. As described herein, the input device can be coupled to the display device by a hinge. In these examples, the input device can be positioned at a location or area that is different than the display device. In this way, the first ambient light sensor can capture or determine a first quantity of light associated with the first area and the second ambient light sensor can capture or determine a second quantity of light associated with a second area.

In some examples, the memory resource 206 can include instructions 226 to determine a difference between the first quantity of light and the second quantity of light. In some examples, the memory resource 206 can include instructions to determine a difference between the first quantity of light and the second quantity of light when an angle between the display device and the input device of the computing device is below a threshold angle. As described herein, the computing device can include sensors that can be utilized to determine an angle between the display device and the input device using the hinge as an intersection point of the angle. As described herein, when the angle is below the threshold angle, it can indicate that the computing device is in a particular orientation, which can indicate that the first ambient light sensor and the second ambient light sensor are to be utilized to determine the lighting of a particular area. In this way, the difference between the first quantity of light and the second quantity of light can be determined to see if the absolute value of the difference exceeds a threshold quantity or is greater than a particular value.

In some examples, the memory resource 206 can include instructions 228 to determine a greater quantity of light. In some examples, the memory resource 206 can include instructions to determine a greater quantity of light between the first quantity of light and the second quantity of light. In some examples, when the absolute value of the difference between the first quantity of light and the second quantity of light is greater than the threshold value, the greater value between the first quantity of light and the second quantity of light can be determined. In some examples, the greater quantity of light can be utilized as a value for altering the brightness of the display device. In other examples, the ambient light sensor that corresponds to the greater quantity of light value can be selected to be utilized for altering the brightness of the display device for a period of time.

In some examples, the memory resource 206 can include instructions 230 to select an ambient light sensor. In some examples, the memory resource 206 can include instructions to select an ambient light sensor from the first ambient light sensor and the second ambient light sensor that received the greater quantity of light to utilize for altering a brightness of the display device. As described herein, the first ambient light sensor can be selected when the first quantity of light is greater than the second quantity of light. In another example, the second ambient light sensor can be selected when the second quantity of light is greater than the first quantity of light.

In some examples, the memory resource 206 can include instructions to determine a presence of an object within a threshold distance of the first ambient light sensor and the second ambient light sensor based on a time of flight sensor. As described herein, the time of flight sensor can be utilized to determine when an object, such as a human user, is within a distance of the first ambient light sensor or within a distance of the second ambient light sensor. In this way, the time of flight sensor can be utilized to determine when a particular object may be blocking or partially blocking light from hitting the first ambient light sensor and/or the second ambient light sensor.

In some examples, the memory resource 206 can include instructions to identify a designated ambient light sensor from the first ambient light sensor and the second ambient light sensor. In these examples, the memory resource 206 can include instructions to select the designated ambient light sensor when the angle is greater than the threshold angle. In some examples, the designated ambient light sensor can be a light sensor that is utilized without consideration of the non-designated ambient light sensor when the angle between the display device and the input device exceeds the threshold angle. In these examples, the designated ambient light sensor can be selected based on a coupling location to the computing device. For example, the designated ambient light sensor can be a light sensor coupled to the display device of the computing device.

Figure 3:
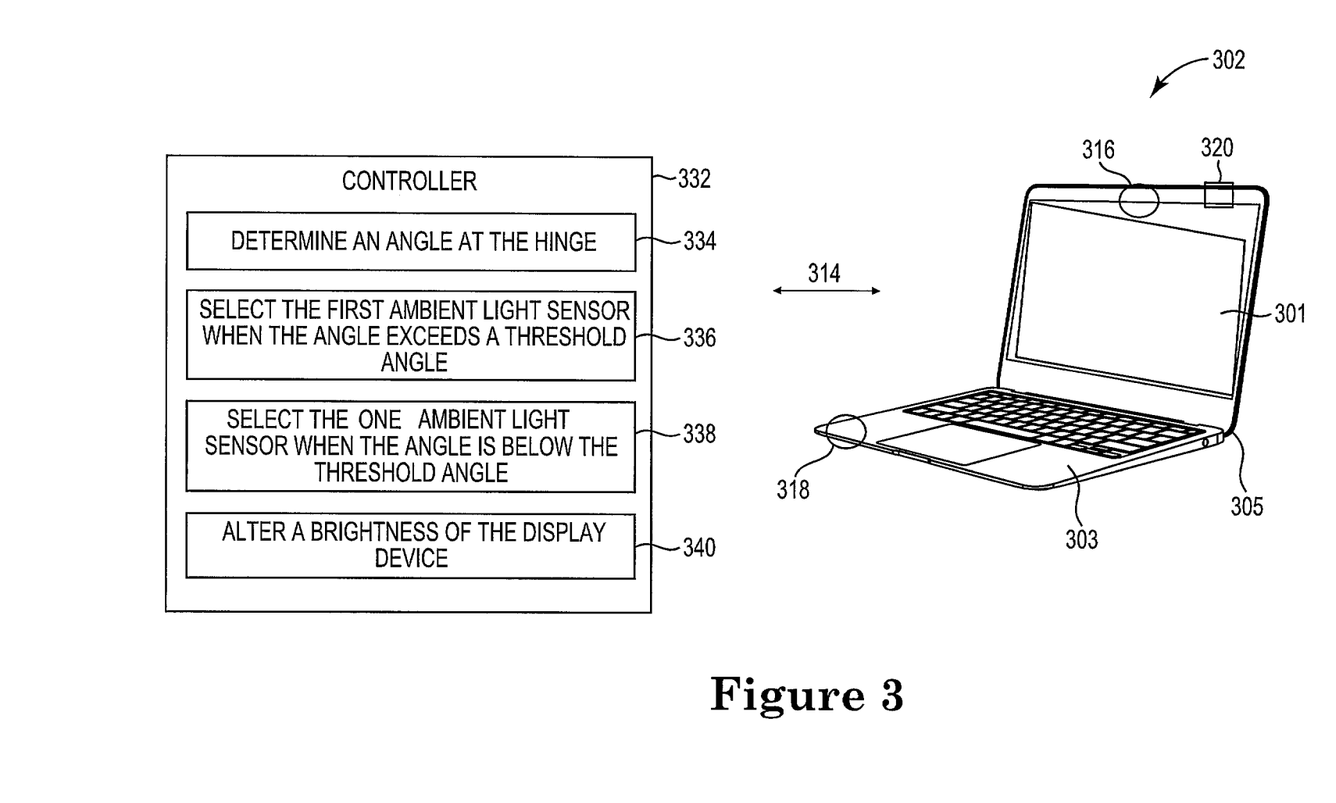
FIG. 3 illustrates an example of a computing device for display device brightness controls.

FIG. 3 illustrates an example of a computing device 302 for display device 301 brightness controls. In some examples the computing device 302 can include a controller 332. The controller 332 can be a device that includes a processor communicatively coupled to a memory resource. In other examples, the controller 332 can be a device that includes hardware, such as an ASIC to perform particular functions 334, 336, 338, 340. In some examples, the controller 332 can perform the functions for the computing device 302 through a communication path 314. In some examples, the controller 332 can be a device within the enclosure of the computing device 302.

The computing device 302 can include a display device 301 coupled to an input device 303 through a hinge 305. In some examples, the hinge 305 can allow the display device 301 to rotate relative to the input device 303 around the hinge 305. In this way, the display device 301 and the input device 303 can be positioned at a plurality of angles with the hinge 305 as the intersection point of the angle.

In some examples, the computing device 302 can include a controller 332 to determine an angle at the hinge 305 at 334. In some examples, the controller 332 can utilize sensor data from a plurality of sensors within the computing device 302 to determine the angle between the display device 301 and the input device 303 at the hinge 305. For example, the controller 332 can receive signals from accelerometer sensors that can be utilized to determine the angle between the display device 301 and the input device 303.

In some examples, the computing device 302 can include a controller 332 to select the first ambient light sensor 316 when the angle exceeds a threshold angle at 336. In some examples, the first ambient light sensor 316 can be selected as a designated ambient light sensor when the angle exceeds the threshold angle. When the first ambient light sensor 316 is selected based on the angle, the light received by the second ambient light sensor 318 can be disregarded or not utilized to determine a brightness level for the display device 301. For example, a first quantity of light received by the first ambient light sensor 316 can be utilized to alter a brightness of the display device 301 and the second quantity of light received by the second ambient light sensor 318 can be disregarded when the angle exceeds the threshold angle.

In some examples, the controller 332 can determine a difference between a first quantity of light received by the first ambient light sensor 316 and a second quantity of light received by the second ambient light sensor 318 exceeds a threshold quantity. In these examples, the angel may not exceed the threshold angle and the difference between the first quantity of light and the second quantity of light can be determined. As described herein, the absolute value of the difference between the first quantity of light and the second quantity of light can be utilized to select an ambient light sensor to be utilized for altering the brightness of the display device 301.

In some examples, the computing device 302 can include a controller 332 to select one ambient light sensor 318 when the angle is below the threshold angle at 338. In some examples, the computing device 302 can include instructions to select the second ambient light sensor 318 when the angle is below the threshold angle and the second ambient light sensor 318 receives a greater quantity of light than the first ambient light sensor 316. As described herein, when the absolute value of the difference between the first quantity of light and the second quantity of light exceeds a threshold value, the ambient light sensor that receives the greater quantity of light can be selected. In this example, the second ambient light sensor 318 receives a greater quantity of light than the first ambient light sensor 316 and thus the second ambient light sensor 318 can be selected.

In some examples, the computing device 302 can include a controller 332 to alter a brightness of the display device 301 at 340. In some examples, the controller 332 can alter the brightness of the display device 301 based on the second quantity of light received by the second ambient light sensor 318 when the second ambient light sensor 318 is selected. In other examples, the controller 332 can alter a brightness of the display device 301 based on the first quantity of light when the first ambient light sensor 316 is selected. In this way, the selected ambient light sensor can be utilized to determine a brightness level for the display device 301.

In some examples, the controller 332 can determine when an object is within a threshold distance of the selected ambient light sensor. In some examples, the time of flight sensor 320 can be utilized to determine when an object is occupying a particular area proximate to the first ambient light sensor 316 and/or the second ambient light sensor 318. In some examples, the selected ambient light sensor can be utilized to alter the brightness level of the display device 301, however, the extend of the alteration can be based on whether an object is within a threshold distance of the selected ambient light sensor. For example, the first ambient light sensor 316 can be the selected ambient light sensor. In this example, the time of flight sensor 320 can determine if an object is present within a threshold distance of the first ambient light sensor 316 and/or computing device 302. In this example, the controller 332 can determine whether to increase or decrease the brightness level and/or what level to increase or decrease the brightness level, based on the location of the object. For example, the distance of the object from the first ambient light sensor 316 can indicate that the object is likely blocking light that would otherwise be received by the first ambient light sensor 316. Thus, in some examples, the controller 332 can alter the brightness of the display device 301 based on the distance between the display device 301 and the object.

Figure 4:
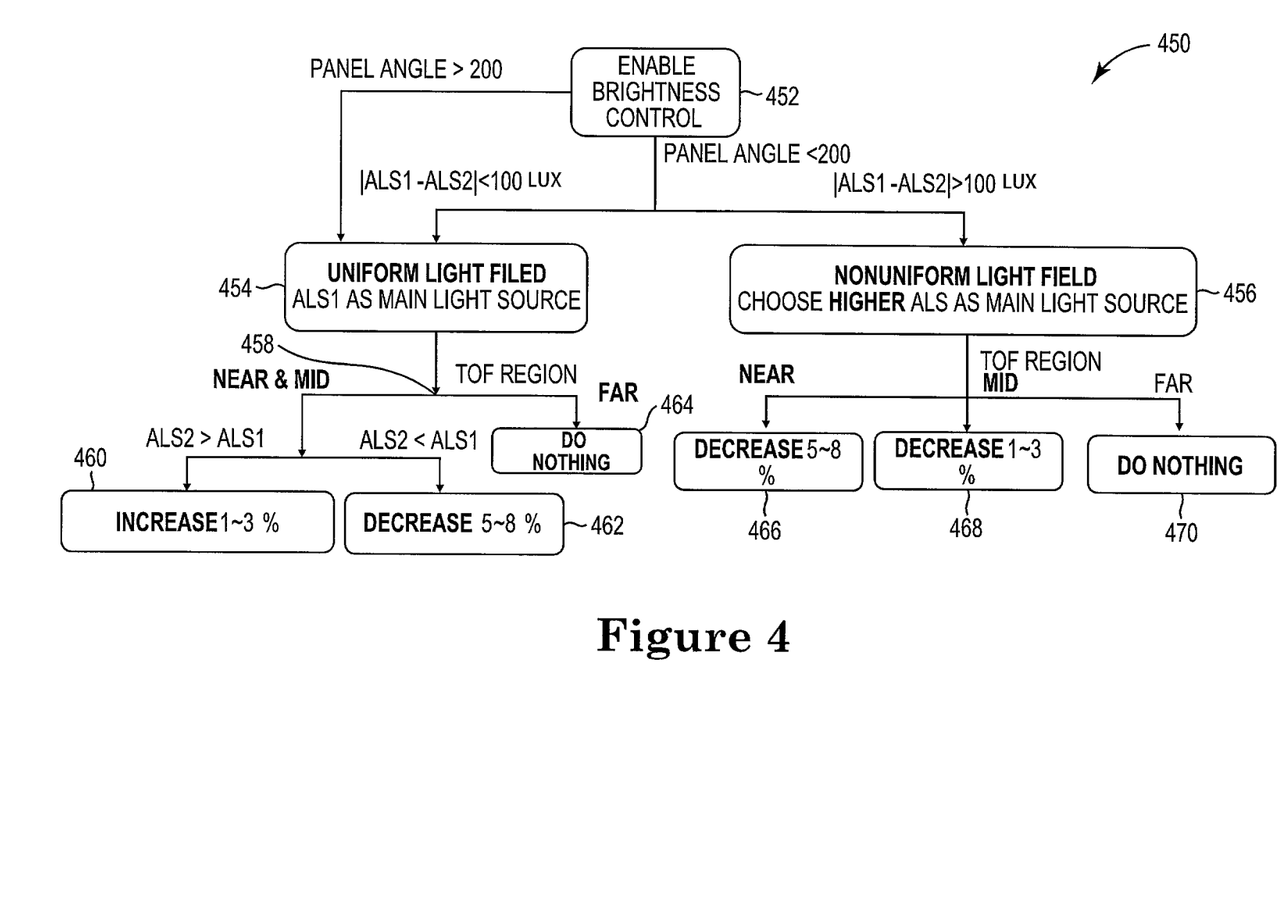
FIG. 4 illustrates an example of a method for display device brightness controls.

FIG. 4 illustrates an example of a method 450 for display device brightness controls. In some examples, the method 450 can illustrate instructions that can be stored on a memory resource and executed by a processor. For example, the method 450 can be performed or executed by a computing device (e.g., computing device 102 as illustrated in FIG. 1, etc.). In other examples, the method 450 can be performed or executed by a controller (e.g., controller 332 as referenced in FIG. 3, etc.). In some examples, the method 450 can begin at 452 by enabling a brightness control. In some examples, the brightness control can refer to an application or other instructions for altering or controlling the brightness of a display device based on the ambient light within an area.

In some examples, the method 450 can determine when the panel angle is greater than a threshold angle. For example, the method 450 can determine when the panel angle (e.g., angle between a display device and an input device, etc.) is greater than 200 degrees. When the panel angle is greater than 200 degrees, the method 450 can move to 454. At 454, the method 450 can select a first ambient light sensor (ALS1) as the designated light sensor. As described herein, a designated light sensor can be selected when the angle between the display device and the input device exceeds the threshold angle (e.g., 200 degrees, etc.). In some examples, the method 450 can determine if an object is within the time of flight (TOF) region based on a time of flight sensor. The time of flight region can be an area within a region where the time of flight sensor can detect an object.

In some examples, the time of flight region can be divided into categories of "Near", "Mid", and "Far". In other examples, the time of flight region can be divided into a distance that exceeds an upper threshold (e.g., Far, etc.), a distance that is below a lower threshold (e.g., Near, etc.), and/or a distance that is between the upper threshold and the lower threshold (e.g., Mid, etc.). In some examples, the method 450 can determine that an object is in the "Far" region and move to 464. At 464 the method 450 can "do nothing" or maintain a current brightness level for the display device.

In some examples, the method 450 can determine that the object within the time of flight region is in the "Near" or "Mid" category. In these examples, the method 450 can determine whether the first ambient light sensor (ALS1) or the second ambient light sensor (ALS2) has received a greater quantity of light. When the first ambient light sensor has received a greater quantity of light, the method 450 can move to 462 and decrease the brightness of the display device. In some examples, the method 450 can decrease the brightness of the display device between 5 percent and 8 percent, however the present disclosure is not so limited. In another example, the method 450 can move to 460 when the second ambient light sensor receives more light than the first ambient light sensor. At 460 the method 450 can increase the brightness of the display device. In some examples, the method 450 can increase the brightness of the display device by 1 percent to 3 percent, however the present disclosure is not so limited.

In some examples, the method 450 can determine that the panel angle is less than the threshold angle. In these examples, the method 450 can move from 452 to determine whether the absolute value of the difference between the first quantity of light captured by the first ambient light sensor and the second quantity of light captured by the second ambient light sensor is greater than or less than a threshold value. The method 450 illustrates the threshold value as 100, but the examples are not so limited. In some examples, the threshold value can be based on the units (e.g., Lux, etc.) of the first quantity of light and second quantity of light. When the absolute value of the difference is less than the threshold value, the method 450 can move to 454 and proceed as described herein. In other examples, the method 450 can move to 456 when the absolute value of the difference is greater than the threshold value.

At 456, the method 450 can include determining whether the first quantity of light captured by the first ambient light sensor is greater than the second quantity of light captured by the second ambient light sensor. In these examples, the method 450 can select the ambient light sensor that captured the greater quantity of light as a selected ambient light sensor to be utilized. For example, the first ambient light sensor can be selected when the first quantity of light is greater than the second quantity of light and the second ambient light sensor can be selected when the second quantity of light is greater than the first quantity of light.

When an ambient light sensor is selected at 456, the method 450 can move to determine when there is an object within the time of flight (TOF) region. When an object is detected in the "Far" region, the method 450 can move to 470 and "do nothing" or maintain the brightness level of the display device. When the object is detected in the "Mid" region, the method 450 can move to 468 to decrease the brightens level of the display device a first percentage. In a specific example, the method 450 can decrease the brightness level of the display device by 1 percent to 3 percent. When the object is detected in the "Near" region, the method 450 can move to 466 to decrease the brightness level a second percentage that is greater than the first percentage. For example, the method 450 can decrease the brightness level 5 percent to 8 percent.

Figure 5:
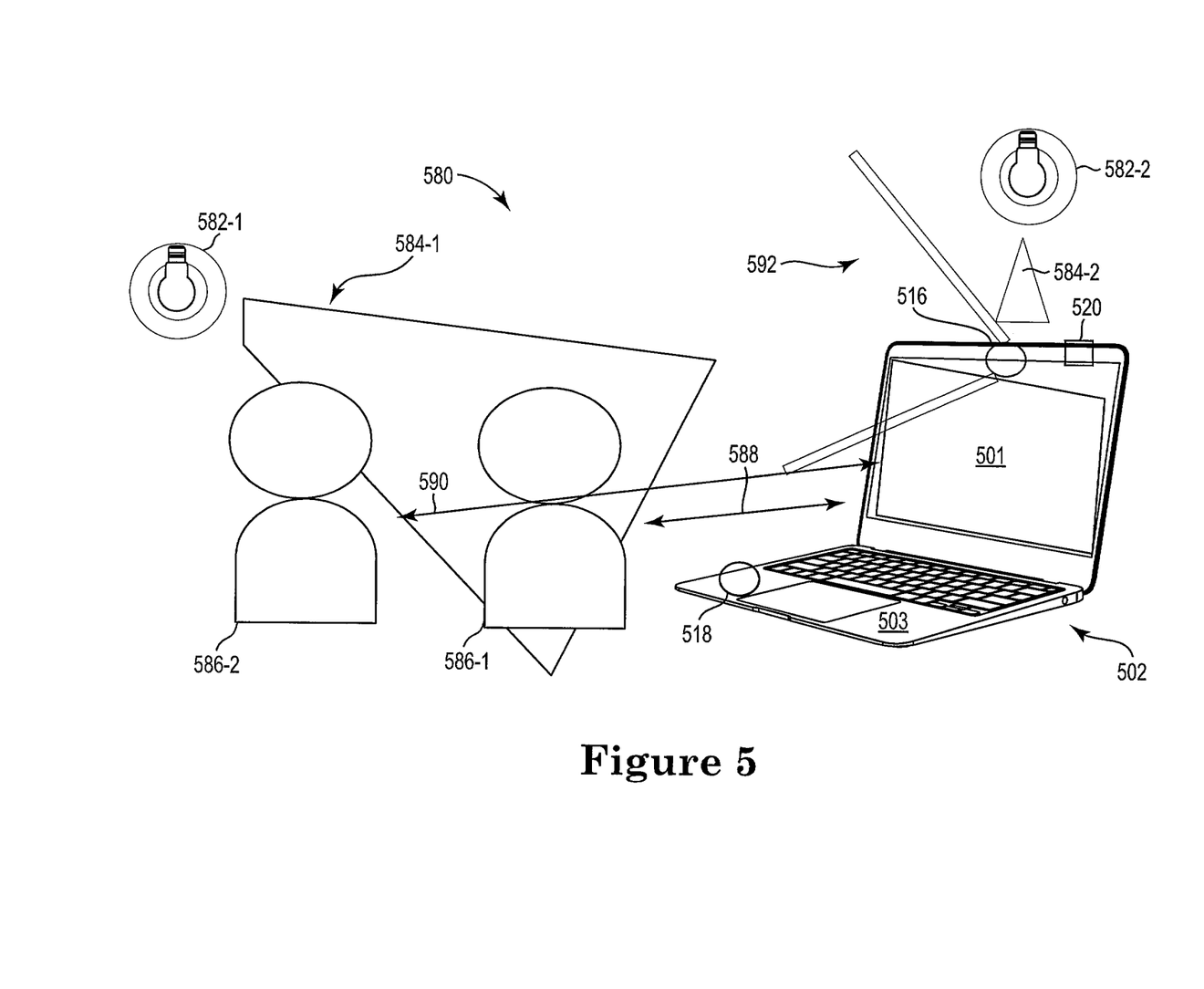
FIG. 5 illustrates an example of a system for display device brightness controls.

FIG. 5 illustrates an example of a system 580 for display device 501 brightness controls. The system 580 includes a computing device 502. As described herein, the computing device 502 can include a display device 501 coupled to an input device 503. In some examples, the display device 501 can include a first ambient light sensor 516 and/or a time of flight sensor 520. In addition, the input device 503 can include a second ambient light sensor 518. As described herein, the first ambient light sensor 516 can be a directional sensor that can detect or detect light within a region 592.

The system 580 can illustrate that the computing device 502 can be positioned within an area that includes multiple light sources 582-1, 582-2 with corresponding light directions 584-1, 584-2. In some examples, the region 592 that the first ambient light sensor 516 is able to detect light may allow for the first ambient light sensor 516 to detect light from a first light source 582-1 with a first light direction 584-1, but may not allow the first ambient light sensor 516 to detect light from a second light source 582-2 with a second light direction 584-2. In this way, the first ambient light sensor 516 may not be able to determine the quantity of light experienced by a user within the area since the area has non-uniform lighting.

As used herein, non-uniform lighting can include an area with relatively brighter areas that are proximate to relatively darker areas. For example, the area between the first light source 582-1 and the second light source 582-2 may be relatively darker than the areas directly below the first light source 582-1 and the second light source 582-2 respectively. In this way, the first ambient light sensor 516 and/or the second ambient light sensor 518 may be within an area that is relatively brighter or relatively darker based on the corresponding locations of the ambient light sensors on the computing device 502.

In some examples, the time of flight sensor 520 can be utilized to determine when an object is within the time of flight region or within a detection area of the time of flight sensor 520. As illustrated by system 580, a user 586-1 can be at a first distance 588 from the display device 501. In some examples, the time of flight sensor 520 can determine whether the user 586-1 is within a "Far", "Mid", or "Near" region of the time of flight region. In some examples, the computing device 502 can alter a brightness of the display device 501 based on the first distance 588. In some examples, the user 586-2 can be a second distance 590 away from the display device 501. In these examples, the second distance 590 can be greater than the first distance 588, thus the user 586-1 is more likely to be blocking the first light direction 584-1 of the first light source 582-1 from reaching the first ambient light sensor 516 than the user 586-2. As described herein, the first distance 588 can be within a threshold distance of the display device 501 and can be utilized to determine that the display brightness of the display device 501 is to be altered. However, the second distance 590 may not be within the threshold distance of the display device 501 and can be utilized to determine that the display brightness should remain constant or not be altered.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and methods of the disclosure. Since many examples can be made without departing from the spirit and scope of the system and method of the disclosure, this specification merely sets forth some of the many possible example configurations and implementations.

What is claimed is:
1. A computing device, comprising:
   a first light sensor to determine a first quantity of light at a first location;
   a second light sensor to determine a second quantity of light at a second location;
   a display device to display images;
   a processor; and
   a non-transitory memory resource storing machine-readable instructions stored thereon that, when executed, cause the processor to:
      determine when a difference between the first quantity of light and the second quantity of light exceeds a threshold quantity;
      select a light sensor from the first light sensor and the second light sensor based on the first quantity of light received by the first light sensor and the second quantity of light received by the second light sensor;

alter a brightness of the display device based on the selected light sensor; and maintain the brightness of the display device when an occupied region of an object relative to the display device exceeds a threshold distance.

2. The computing device of claim 1, comprising a time of flight sensor to determine when an object is within a region of the device, wherein the processor is to alter the brightness of the display device based when the time of flight sensor determines the object is within the region of the device.

3. The computing device of claim 1, wherein the processor is to select the light sensor from the first light sensor and the second light sensor based on an angle between the display device and an input device coupled to the display device.

4. The computing device of claim 1, wherein the processor is to increase a brightness of the display device when the second light sensor receives a greater quantity of light than the first light sensor and to decrease the brightness of the display device when the first light sensor receives a greater quantity of light than the second light sensor.

5. The computing device of claim 1, wherein the processor is to determine the difference between the first quantity of light and the second quantity of light in response to a determination that an angle between the display device and an input device is below a threshold angle.

6. The computing device of claim 1, wherein the processor is to determine the first quantity of light is associated with a first area surrounding the device based on the first location and determine the second quantity of light is associated with a second area surrounding the device based on the second location.

7. A non-transitory memory resource storing machine-readable instructions stored thereon that, when executed, cause a processor of a computing device to:

receive a first quantity of light from a first ambient light sensor coupled to a display device;

receive a second quantity of light from a second ambient light sensor coupled to an input device;

determine a difference between the first quantity of light and the second quantity of light when an angle between the display device and the input device of the computing device is below a threshold angle;

determine a greater quantity of light between the first quantity of light and the second quantity of light;

determine a presence of an object within a threshold distance of the first ambient light sensor and the second ambient light sensor based on a time of flight sensor; and select an ambient light sensor from the first ambient light sensor and the second ambient light sensor that received the greater quantity of light to utilize for altering a brightness of the display device.

8. The memory resource of claim 7, wherein the processor is to identify a designated ambient light sensor from the first ambient light sensor and the second ambient light sensor.

9. The memory resource of claim 8, wherein the processor is to select the designated ambient light sensor when the angle is greater than the threshold angle.

10. A computing device, comprising:

a display device that includes a first ambient light sensor;

an input device that includes a second ambient light sensor;

a hinge to connect the display device and the input device; and a controller to:

determine an angle at the hinge;

select the first ambient light sensor when the angle exceeds a threshold angle;

select the second ambient light sensor when the angle is below the threshold angle and the second ambient light sensor receives a greater quantity of light than the first ambient light sensor;

determine when a distance of an object is within a threshold distance of the selected ambient light sensor; and alter a brightness of the display device based on the selected ambient light sensor and the distance of the object.

11. The computing device of claim 10, wherein the controller is further to determine a difference between a first quantity of light received by the first ambient light sensor and a second quantity of light received by the second ambient light sensor exceeds a threshold quantity.

* * * * *